Oct. 31, 1933.  B. BURNS  1,932,445
WHEEL SUSPENSION MEANS
Filed May 14, 1930  3 Sheets-Sheet 1

INVENTOR:
Bruce Burns,
BY
ATTORNEY.

Oct. 31, 1933.  B. BURNS  1,932,445
WHEEL SUSPENSION MEANS
Filed May 14, 1930  3 Sheets-Sheet 2
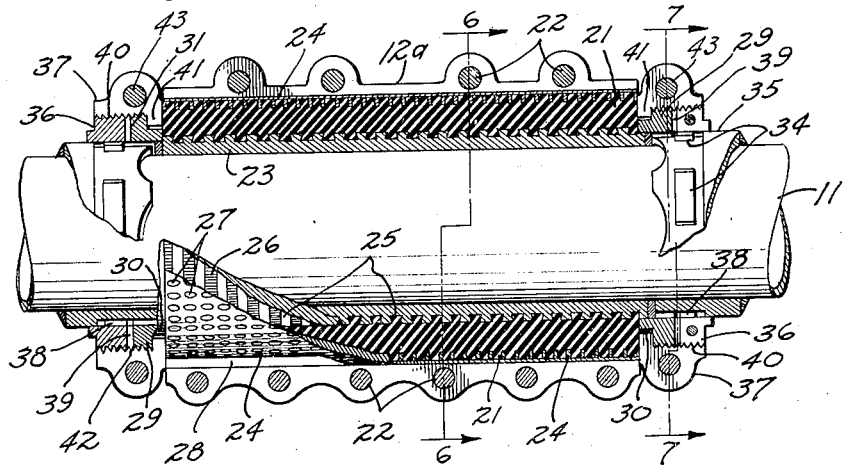
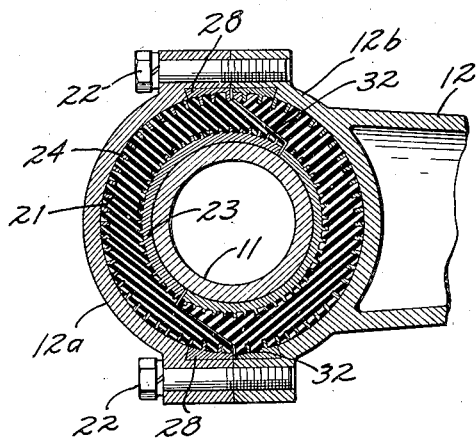
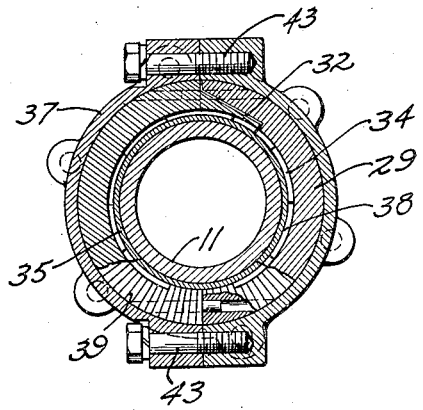
INVENTOR:
Bruce Burns,
BY
ATTORNEY.

Oct. 31, 1933.     B. BURNS     1,932,445
WHEEL SUSPENSION MEANS
Filed May 14, 1930     3 Sheets-Sheet 3
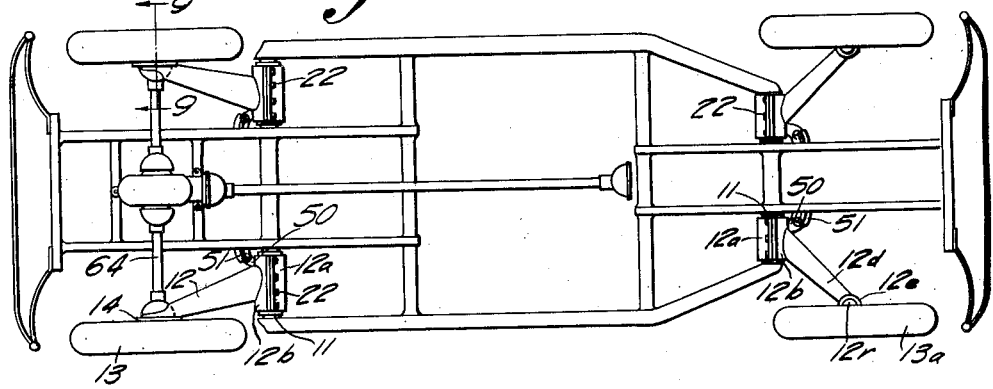
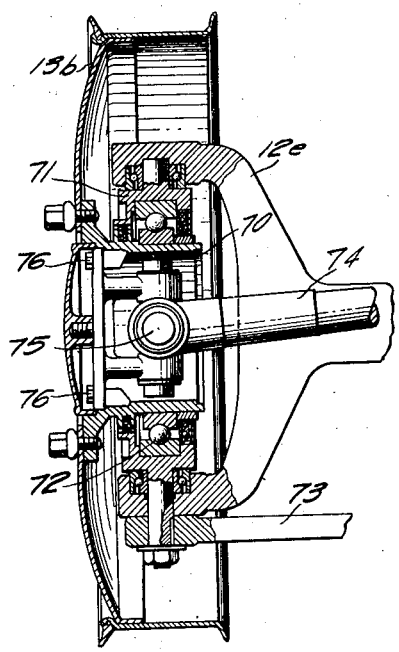
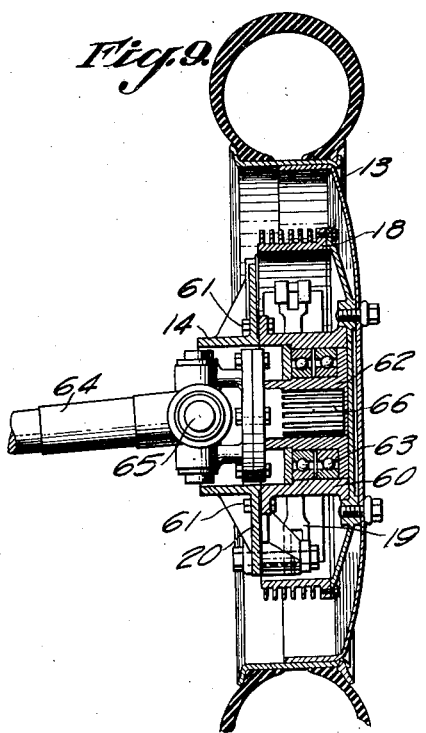
INVENTOR:
Bruce Burns,
BY
Attorney.

Patented Oct. 31, 1933

1,932,445

UNITED STATES PATENT OFFICE 1,932,445

WHEEL SUSPENSION MEANS

Bruce Burns, Los Angeles, Calif., assignor to Hughes Tool Company, Houston, Tex., a corporation of Texas Application May 14, 1930. Serial No. 452,327

17 Claims. (Cl. 280—124)

This invention relates to a wheel suspension means for motor vehicles and is particularly directed to that general type of wheel arrangement in which each wheel is mounted for independent bodily movement relative to the vehicle frame.

In arrangements of this general character heretofore proposed it has been the usual practice to employ spring means to provide the necessary resiliency between the wheel and the supporting frame of the vehicle, and it has been found that such spring means are subject to failure under rough usage and also under long usage are subject to crystallization and breakage. It has also been found that spring suspension means, particularly of the leaf-spring type, require constant attention and lubrication in order to retain their maximum resiliency and to eliminate noise, such as spring squeaks.

It is therefore an object of the present invention to provide a wheel suspension means entirely devoid of springs.

A further object is to provide an arrangement in which the wheel is carried by a radius arm pivotally connected to the frame by means of a resilient pivot joint in which the load is transmitted through a body of rubber or other similar material and in which relative movement between the frame and said wheel carrying arm is permitted entirely by reason of the flection of the rubber.

A further object is to provide a resilient pivotal mounting for a wheel carrying radius arm, having a renewable torsion unit and being longitudinally split into sections capable of being transversely applied to a supporting axle.

Another object is to provide a wheel suspension means of the above character in which the radius arm is capable of initial circular adjustment relative to its pivot axle, thus to permit independent initial vertical adjustment of each wheel of a vehicle whereby the vehicle may be leveled and the desired normal road clearance may be established for various load conditions.

Various other objects and advantages will be more fully apparent from the following description of the accompanying drawings which form a part of this disclosure, and which illustrate a preferred form of embodiment of the invention.

Of the drawings:—

Fig. 5 is an enlarged detail section taken on the line 5—5 of Fig. 1.

Fig. 6 is a transverse section taken on the line 6—6 of Fig. 5.

Fig. 7 is a transverse section taken on the line 7—7 of Fig. 5.

Fig. 8 is a plan view of another form of vehicle frame, showing four supporting wheels, the front wheels being steering wheels and the rear wheels being driving wheels.

Fig. 9 is an enlarged detail section taken on the line 9—9 of Fig. 8.

Fig. 10 is a vertical section through a wheel which serves both as a driving and steering wheel, as in a front-wheel-drive vehicle.

Figure 1:
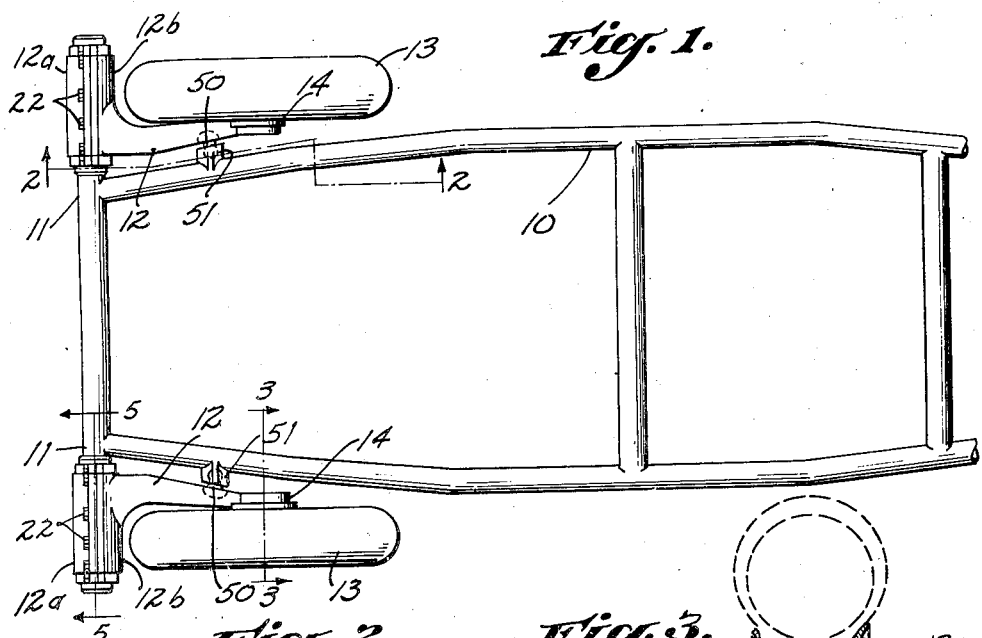
Fig. 1 is a plan view of a portion of a vehicle frame and rear supporting wheels mounted thereon by means of the improved arrangement which will herein be described in detail.
Figure 2:
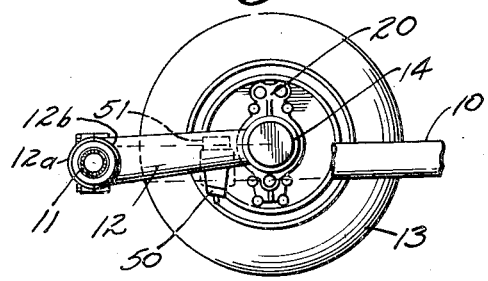
Fig. 2 is a detail section taken on the line 2—2 of Fig. 1.
Figure 4:
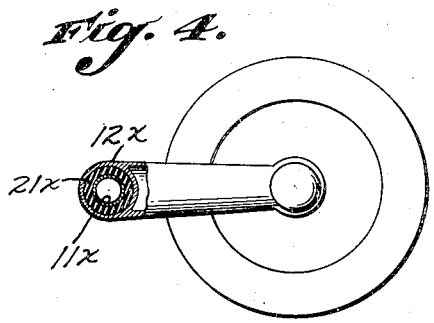
Fig. 4 is a semi-diagrammatic view illustrating the broad principle involved in the present invention.
Figure 3:
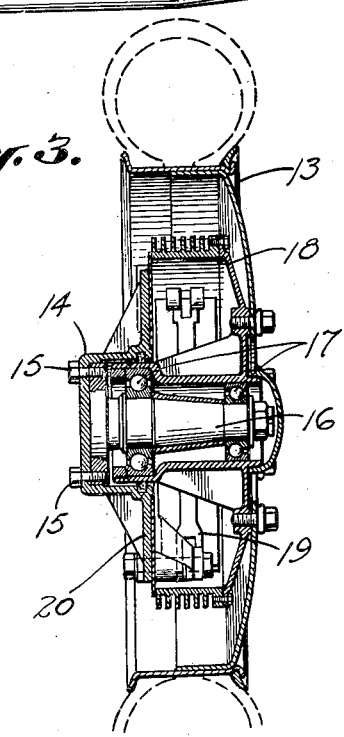
Fig. 3 is an enlarged detail section taken on the line 3—3 of Fig. 1.

In the wheel suspension construction illustrated in Figs. 1, 2, and 3, the driving means of the vehicle is not connected to the wheels, this arrangement being of utility in front-wheel-drive vehicles, and also in trailer construction where no driving means is employed.

From an examination of Figs. 1 and 2 of the drawings it will be seen that a frame 10 of the vehicle is provided with two opposed transversely extended pivot axles 11 carrying forwardly extending radius arms 12 which support respective wheels 13. The mechanism associated with each wheel will preferably be of the same character as that associated with the other wheel, so that it will suffice herein to describe in detail only one of such mechanisms.

The outer end of the radius arm 12, in the preferred construction illustrated in Fig. 3 has a cup-shaped portion 14 in which is secured, by bolts 15, a transverse stub-axle 16 upon which the wheel 13 is rotatably journaled by means of suitable bearings 17. These bearings 17 and the wheel 13 may be of any specific construction desired and the wheel may be provided with an internal brake drum 18, or a suitable external brake drum, positioned to cooperate with suitable brake mechanism illustrated generally at 19, such brake mechanism being supported upon a flange 20 extending from the cup-shaped portion 14 of the radius arm 12. This arrangement provides a radius arm having fixed to its outer end a stub-axle upon which the wheel is rotatably mounted, and brake mechanism carried by said arm and adapted to cooperate with a brake drum carried by the wheel, it of course being understood that any of the many brake mechanisms adaptable for use in this situation may be employed.

The radius arm 12 is mounted upon the joint axle portion 11 of the frame by an oscillatory joint structure which permits vertical oscillation of said arm, and broadly this joint structure is illustrated in semi-diagrammatic form in Fig.

4, in which the radius arm is shown as having a hub portion 12ˣ surrounding and spaced from the joint axle 11ˣ, with the space between said hub portion 12ˣ and the joint axle 11ˣ containing a body of rubber 21ˣ, or other suitable resilient material, which is vulcanized or otherwise secured to both members of the joint.

In this type of joint the body of rubber is secured against bodily rotation or oscillation relative to the two members to which it is secured and relative oscillation of the two joint members is permitted entirely by distortion of the rubber.

In vehicle construction, particularly motor vehicles which require relatively heavy chassis construction, it would be difficult to vulcanize or otherwise permanently secure the rubber directly to the hub and the joint axle, and it would be quite undesirable to do so since in the event of such failure of the rubber as to require replacement, such replacement would then become a factory job requiring disassembling of the vehicle and shipment of the frame and connected radius arms to the factory. This, together with the replacement and the reassembling of the vehicle, would be prohibitive in cost.

It will therefore be apparent that in a wheel suspension arrangement of this character it is desirable that the joint structure be of a type which may be easily disconnected from the supporting joint axle extension 11 of the vehicle frame, and since it would be quite undesirable in event of failure of the joint structure to have to also replace the entire radius arm 12, it will also be of advantage to provide a joint structure which is detachably connected to the radius arm instead of being permanently secured thereto.

To provide a wheel suspension having these desirable features I employ a longitudinally split joint structure of the character illustrated in Figs. 5 to 7, and which is more fully disclosed in my pending application Serial No. 383,628, to which reference may be had for a more detailed description.

In this preferred joint construction, the hub portion of the radius arm 12 is longitudinally split into two opposed sections 12ᵃ and 12ᵇ adapted to be clamped together by bolts 22. Surrounding the joint axle 11, within the hub sections 12ᵃ and 12ᵇ, is a torsion unit comprising an inner shell 23, an outer shell 24 which surrounds and is spaced from the inner shell, and an intermediate body of rubber 21 disposed between said shells and secured thereto, preferably by vulcanizing. The outer surface of the inner shell 23 and the inner surface of the outer shell 24 are roughened or scored to facilitate the securing of the rubber thereto, such scoring of the inner shell 23 being preferably in the form of cross grooves 25 and 26 cut in its outer periphery, as shown in Figs. 5 and 6, and of the outer shell 24 being preferably in the form of perforations 27.

The inner shell 23 is provided with means (to be later described) by which it is removably locked to the joint axle 11 and the outer shell 24 has opposed longitudinal dovetail ribs 28 adapted to engage within companion grooves formed in the inner periphery of the hub sections 12ᵃ and 12ᵇ, as illustrated in Fig. 6. At each end, the inner shell 23 is provided with a flange 29 defining an exterior groove 30 and the outer face of each flange is provided with radial teeth 31. This torsion unit is longitudinally split at diametrically opposite points, as indicated at 32 in Fig. 6, so as to divide said unit two sections adapted to be transversely applied to the supporting joint axle 11, and in the preferred construction the splits 32 are angled so that the coengaging edges of the unit sections overlap when said unit is installed.

At each end of this torsion unit, means is provided for locking its inner shell 23 to the joint axle 11, and in each instance such means includes a circular series of clutch lugs 34 preferably formed on a clutch sleeve 35 which is welded to or otherwise permanently fixed on the axle 11, a clutch ring 36, and a retaining collar 37.

The clutch ring 36 has formed on its inner periphery a circular series of clutch lugs 38 adapted to coengage with the clutch lugs 34 on the joint axle 11, its inner radial face is provided with radial teeth 39 adapted to coengage with the radial teeth 31 of the torsion unit, and its outer periphery is screw-threaded as indicated at 40, said clutch ring being diametrically split into two opposed sections which may be transversely applied from opposite sides of the joint axle.

The retaining collar 37 has an internal flange 41 adapted to engage within the groove 30 of the torsion unit and a screw-threaded bore 42 in which the screw-threaded clutch ring 36 engages. Said collar is diametrically split into two opposed sections which may be transversely applied and then clamped in place by bolts 43.

In an installation of this joint structure, the companion sections of both clutch rings 36 are assembled upon the joint axle between the two series of clutch lugs 34 and said clutch rings are then slid in opposite directions so that their clutch lugs 38 intermesh with the companion clutch lugs 34 of the joint axle.

Having thus applied the clutch rings 36, the two sections of the torsion unit may be transversely applied to the axle between said rings, and said rings will then be slid inwardly to engage their radial teeth 39 with the companion radial teeth 31 of the inner shell 23 of the torsion unit. The two half-sections of each retaining collar 37 are then transversely applied, the flange 41 of each collar engaging in the respective groove 30 in the inner shell of the torsion unit and the screw-threads 42 engaging the external screw-threads 40 of the associated clutch ring 36, as shown in Fig. 5. The sections of the retaining collars 37 are then brought together by the bolts 43 but not at this time tightly clamped thereby. By suitable means, the retaining collars 37 may be rotated to draw the respective clutch rings 36 tightly against the ends of the torsion unit with their radial teeth 39 in close intermeshing engagement with the companion radial teeth 31, after which the bolts 43 of the respective retaining collars 37 are tightened to rigidly clamp said collars in place.

Thus, the inner shell 23 of the torsion unit is locked against rotation relative to the joint axle 11, through the medium of the cooperating radial teeth on said inner shell and on the clutch rings and through the cooperating clutch lugs on said clutch rings and on the fixed sleeves of the joint axle.

With these parts so installed, the sections 12ᵃ and 12ᵇ of the radius arm hub may be transversely applied to the opposite sides of the torsion unit and clamped rigidly thereto by the clamp bolts 22 with the dovetail ribs 28 of said unit engaging in the companion dovetail grooves formed in the inner surface of the hub sections 12ᵃ and 12ᵇ, as shown in Fig. 6.

An arrangement of the above-described character provides a wheel suspension which is entirely devoid of springs and of frictionally engaging parts, and such arrangement provides a suspension joint structure which is easily demountable for replacement or repair without disturbing the other parts of the vehicle. Furthermore, the provision of a separable torsion unit renders it unnecessary, upon failure of the rubber torsion element, to replace the large and costly radius arm, it being only necessary in such cases to replace the relatively inexpensive torsion unit.

In a vehicle having this type of wheel suspension, it will be understood that the load is supported by the wheels entirely through the medium of the rubber torsion elements and that the vertical movements of the wheels relative to the frame will cause a torsional distortion or stretching of these rubber torsion elements with a gradually increasing cushioning effect. When the torsional stress is removed the rubber torsion element assumes substantially its normal condition with little or no rebound.

To guard against excessive oscillation of the radius arm under excessive load or excessive road shocks, it is desirable to provide a stop means for limiting the upward movement of said arm relative to the vehicle frame and for this purpose there is provided a stop projection 50 on the arm 12 which is aligned with a stop bracket 51 secured to the vehicle frame, it being understood that the projection 50 is spaced from the bracket 51 to allow a desired maximum oscillation of the wheel arm 12 and to engage said bracket and arrest the movement of said arm if it is inclined to oscillate beyond such desired maximum.

While in Fig. 1 the wheel is shown as mounted upon the free end of a forwardly extending radius arm, it will be apparent from an examination of Fig. 8 that this structure may be reversely mounted so that said radius arm is reversed so as to extend rearwardly from its associated pivot axle. It will also be obvious that the wheels shown in Fig. 1 may be arranged as illustrated in Figs. 8 and 9 so as to serve as driving wheels.

In the rear wheel construction shown in Figs. 8 and 9 there is employed the same type of joint structure and radius arm as that above described, and in Figs. 8 and 9 similar reference characters designate similar parts, it being deemed unnecessary to repeat the detailed description of this joint construction in its specific employment shown in Fig. 8.

In Fig. 9 it will be noted that the member 14 has no inner wall, this member thus being in the form of an annular ring providing a central opening into which the drive axle extends. A fixed hub 60 is secured by bolts 61 to the inner surface of the brake supporting flange 20 and the wheel 13 is provided with an inwardly extending hub 62 which is journaled to rotate in the fixed hub 60, by means of suitable bearings 63, thus rotatably mounting the wheel on the free end of the radius arm. The drive axle 64 is connected by means of a universal joint 65 with a terminal axle section 66 which is keyed in the bore of the hub 62 of the wheel, thus forming the driving connection between the drive axle 64 and the wheel 13.

The steering wheel arrangement shown in Fig. 8 also includes the above described joint construction, but in this instance the free end of the radius arm 12$^d$ has the usual forked outer end 12$^e$ in which is vertically journaled the usual king-pin 12$^r$ upon which the wheel 13$^a$ rotates.

In Fig. 10 this steering wheel arrangement is shown in modified form, as being also a drive wheel, this being an arrangement particularly adaptable for front-wheel-drive vehicles. When thus employed, the wheel 13$^b$ has a hollow hub 70 which is rotatable journaled in a king-pin yoke 71 by means of suitable bearings 72, this yoke being vertically journaled in the forked end 12$^e$ of the radius arm and having associated therewith suitable steering connections, such as the steering arm 73. The drive axle 74 is connected to a universal joint 75, the outer member of which is secured to the wheel by bolts 76.

It will thus be evident that the wheel suspension means forming the basis of the present invention is adaptable for use in connection with a simple form of supporting wheel, a drive wheel, a steering wheel, or a combined driving and steering wheel, thus rendering it fully susceptible for being variously incorporated in a vehicle structure.

An important feature of the present invention is a provision of means which will permit an initial circulation adjustment of the radius arm relative to the pivot axle to bring said radius arm to a desired normal load position.

Such initial adjustability of the suspension means of each of the wheels of a vehicle is highly desirable for the purpose of leveling the vehicle frame transversely, for the purpose of leveling the frame longitudinally or bringing it to a desired longitudinal plane which may deviate more or less from the horizontal, and also to initially adjust the frame to a proper elevation to provide the desired normal road clearance.

In the specific type of joint structure illustrated in Figs. 5 and 7, this means of united adjustment is provided by the cooperating radial teeth 31 and 39 on the inner shell 23 of the torsion unit and on the clutch rings 36. These circularly arranged radial teeth permit the inner shell 23 of the torsion unit to be circularly adjusted before being clamped to the clutch rings 36 by the retaining collars 37, and since said clutch rings 36 are locked against rotation relative to the joint supporting axle 11 by the coengaging clutch lugs 34 and 38, this arrangement provides a means for initially adjusting the inner shell of the torsion unit relative to the axle.

Further, since the inner and outer shells of the joint are connected by the intermediate body of rubber, this arrangement provides a means for predetermining the normal load position of the radius arm in relation to the pivot axle of the joint structure. It will therefore be understood that I have thus provided an independent adjustment means for each wheel supporting radius arm of the vehicle, thus permitting the several radius arms of said vehicle to be independently and circularly adjusted initially to desired normal load positions so as to suspend the vehicle in the desired plane and at a proper distance from the road to provide necessary road clearance, and while the specific adjusting means above described has been found to be particularly efficient for this purpose, it will of course be understood that I may use various other specific means of equivalent character which will permit initial circular adjustment of the inner shell of the joint structure relative to the joint supporting pivot axle.

The mechanism herein disclosed provides an independent suspension for each wheel, yieldable to compensate for road shocks without appreciable rebound, thus combining the desirable functions of the ordinary suspension springs and the ordinary shock absorbers or snubbers, and it also provides an arrangement which will prevent excessive side-sway of the vehicle. Further, it provides means permitting each wheel suspension mechanism to be initially adjusted to level the vehicle transversely, to determine its longitudinal plane, and to elevate or lower the frame to provide the desired road clearance under various load conditions.

Of course, while I consider the mechanism herein disclosed as being fully capable of fulfilling all of the objects primarily stated, it is to be understood that I do not wish to limit the invention to the specific embodiment illustrated and described herein, for it is susceptible of embodiment in various other forms, all of which may properly be considered as coming within the scope of the following claims.

I claim as my invention:

1. In a vehicle, the combination of: a frame having a stationary pivot axle; a removable sleeve attached to said axle and maintained against oscillation relative thereto; an oscillatory radius arm having a hub surrounding and spaced from said sleeve; an intermediate torsion element of resilient material secured to said sleeve and said hub against rotary separation therefrom and capable of distortion permitting oscillation of said radius arm; and a ground wheel journaled on the free end of said arm.

2. In a vehicle, the combination of: a frame having a stationary pivot axle; an oscillatory radius arm having a hub surrounding and spaced from said axle; a replaceable torsion unit between said axle and said hub, said unit comprising an inner shell having an interlocking engagement with said axle, an outer shell spaced from said inner shell and having an interlocking engagement with said hub, and an intermediate torsion element of resilient material secured on its peripheries to both shells against rotary separation therefrom and capable of distortion permitting oscillation of said outer shell and said radius arm; and a ground wheel journaled on the free end of said arm.

3. In a vehicle, the combination of: a frame having a stationary pivot axle; an oscillatory radius arm having a hub surrounding and spaced from said axle; a replaceable torsion unit between said axle and said hub, said unit comprising an inner shell having an interlocking engagement with said axle, an outer shell spaced from said inner shell and having an interlocking engagement with said hub, and an intermediate torsion element of resilient material secured to both shells against rotary separation therefrom and capable of distortion permitting oscillation of said outer shell and said radius arm, said unit being transversely split throughout its length to divide it into separable sections adapted to be transversely applied from opposite sides to embrace said axle, and said hub being transversely split throughout its length to divide it into separable sections adapted to be transversely applied from opposite sides to embrace said torsion unit; means for clamping said hub sections together on said torsion unit when thus applied; and a ground wheel journaled on the free end of said arm.

4. In a vehicle, the combination of: a frame having a pivot axle; a torsion unit mounted on said axle and including a stationary inner shell, an outer shell surrounding and spaced from said inner shell, and an intermediate body of resilient material secured to both shells against rotary separation therefrom and capable of distortion permitting oscillation of said outer shell; a radius arm secured to said outer shell; a ground wheel journaled on the free end of said arm, said torsion unit being transversely split throughout its length to divide it into separable sections adapted to be transversely applied from opposite sides to embrace said axle; and means for clamping said sections together when thus applied upon said axle.

5. In a vehicle, the combination of: a frame having a stationary joint axle provided with a series of clutch elements; an inner shell mounted on said axle and provided with a series of clutch elements; a connecting member intermeshing with both series of clutch elements to lock said shell to said axle; an outer shell surrounding and spaced from said inner shell; an intermediate body of resilient material secured to both shells against rotary separation therefrom and capable of distortion permitting oscillation of said outer shell; a radius arm secured to said outer shell; and a ground wheel journaled on the free end of said arm.

6. In a vehicle, the combination of: a frame having a stationary pivot axle; a replaceable torsion unit mounted on said axle and including an inner shell, an outer shell surrounding and spaced from the periphery of said inner shell, and an intermediate body of resilient material secured to both shells against rotary separation therefrom and capable of distortion permitting oscillation of said outer shell; a radius arm having a hub embracing the periphery of said outer shell; means for interlocking said inner shell with said axle; means for interlocking said outer shell with said hub; and a ground wheel journaled on the free end of said arm.

7. In a vehicle, the combination of: a frame having a stationary pivot axle; a replaceable torsion unit mounted on said axle and including an inner shell, an outer shell surrounding and spaced from said inner shell, and an intermediate body of resilient material secured to both shells against rotary separation therefrom and capable of distortion permitting oscillation of said outer shell; a radius arm having a hub embracing said outer shell; means for interlocking said inner shell with said axle; means for interlocking said outer shell with said hub; a ground wheel journaled on the free end of said arm, said torsion unit being transversely split throughout its length to divide it into separable sections adapted to be transversely applied from opposite sides to embrace said axle and said hub being transversely split throughout its length to divide it into separable sections adapted to be transversely applied from opposite sides to embrace said unit; and means for clamping said hub sections together on said unit.

8. In a vehicle, the combination of: a frame having a pivot axle; a torsion unit mounted on said axle and including a stationary inner shell, an outer shell surrounding and radially spaced from said inner shell, and an intermediate body of resilient material secured to both shells against rotary separation therefrom and capable of distortion permitting oscillation of said outer shell; a radius arm secured to said outer shell; means for limiting the oscillation of the radius arm; and a ground wheel journaled on the free end of said arm.

9. In a vehicle, the combination of: a frame having a stationary joint axle provided with a series of clutch elements; an inner shell mounted on said axle and provided with a series of clutch elements; a connecting member intermeshing with both series of clutch elements to lock said shell to said axle; an outer shell surrounding and spaced from said inner shell; an intermediate body of resilient material secured to both shells against rotary separation therefrom and capable of distortion permitting oscillation of said outer shell; a radius arm secured to said outer shell; means for limiting the distortion of said resilient material; and a ground wheel journaled on the free end of said arm.

10. In a vehicle, the combination of: a frame having a stationary pivot axle; a replaceable torsion unit mounted on said axle and including an inner shell, an outer shell surrounding and spaced from said inner shell, and an intermediate body of resilient material having its peripheral faces secured to both shells against rotary separation therefrom and capable of distortion permitting oscillation of said outer shell; a radius arm having a hub embracing said outer shell; means for interlocking said inner shell with said axle; means for interlocking said outer shell with said hub; means for limiting the torque to which said resilient material is subjected; and a ground wheel journaled on the free end of said arm.

11. In a vehicle, the combination of: a frame having a stationary joint axle; a torsion unit carried by said joint axle and including an inner shell and an outer shell joined by a body of resilient material disposed radially between said shells and capable of distortion permitting relative oscillation of said shells; means for locking one of said shells to said joint axle; a radius arm having a locking engagement with the other of said shells; means for limiting the stress to which said resilient material is subjected; and a ground wheel journaled on the free end of said radius arm, whereby the entire load is carried by said body of resilient material.

12. In a vehicle, the combination of: a frame having a stationary pivot axle; an oscillatory radius arm having a hub surrounding and spaced from said axle; a replaceable torsion unit between said axle and said hub, said unit comprising an inner shell having a releaseable interlocking engagement with said axle, an outer shell spaced from said inner shell and having an interlocking engagement with said hub, and an intermediate torsion element of resilient material secured to both shells against rotary separation therefrom and capable of distortion permitting oscillation of said outer shell and said radius arm; a ground wheel juornaled on the free end of said arm; and means for varying the interlocking engagement of said inner shell with said axle for circularly adjusting said torsion unit relative to said pivot axle.

13. In a vehicle, the combination of: a frame having a stationary pivot axle; an oscillatory radius arm having a hub surrounding and spaced from said axle; a replaceable torsion unit between said axle and said hub, said unit comprising an inner shell having an interlocking engagement with said axle, an outer shell spaced from said inner shell and having an interlocking engagement with said hub, and an intermediate torsion element of resilient material secured to both shells against rotary separation therefrom and capable of distortion permitting oscillation of said outer shell and said radius arm, said unit being transversely split throughout its length to divide it into separable sections adapted to be transversely applied from opposite sides to embrace said axle, and said hub being transversely split throughout its length to divide it into separable sections adapted to be transversely applied from opposite sides to embrace said torsion unit; means for clamping said hub sections together on said torsion unit when thus applied; a ground wheel journaled on the free end of said arm; and means permitting initial circular adjustment of said torsion unit relative to said pivot axle.

14. In a vehicle, the combination of: a frame having a pivot axle; a torsion unit mounted on said axle and including a stationary inner shell, an outer shell surrounding and spaced from said inner shell, and an intermediate body of resilient material secured to both shells against rotary separation therefrom and capable of distortion permitting oscillation of said outer shell; a radius arm secured to said outer shell; a ground wheel journaled on the free end of said arm, said torsion unit being transversely split throughout its length to divide it into separable sections adapted to be transversely applied from opposite sides to embrace said axle; means for clamping said sections together when thus applied upon said axle; and means permitting initial circular adjustment of said torsion unit relative to said pivot axle.

15. In a vehicle, the combination of: a frame having a stationary pivot axle; an inner shell mounted on said axle and provided with a circular series of radial clutch elements; a connecting member slidably keyed to said axle and having a companion circular series of radial clutch elements adapted to selectively engage the clutch elements of said inner shell to lock it to said axle; an outer shell surrounding and spaced from said inner shell; an intermediate body of resilient material secured to both shells against rotary separation therefrom and capable of distortion permitting oscillation of said outer shell; a radius arm secured to said outer shell; and a ground wheel journaled on the free end of said radius arm.

16. In a vehicle, the combination of: a frame having an axle; a wheel supporting arm; inner, outer, and intermediate sleeves surrounding said axle, said inner sleeve being adapted for attachment to said axle, said outer sleeve being connected to said arm, and said intermediate sleeve comprising a resilient member connected to said inner and outer sleeves and capable of distortion permitting relative oscillation of said inner and outer sleeves, said sleeves being transversely divided; means for securing said sleeves together around said axle; and a wheel associated with the free end of said arm.

17. In a vehicle, the combination of: a frame having an axle; a radius arm having a sleeve surrounding and spaced from said axle, said sleeve being transversely divided; an inner concentric sleeve transversely divided; means for securing said inner sleeve to said axle in nonrotatable relationship; an intermediate sleeve of rubber secured to said inner sleeve and said sleeve of said radius arm, said intermediate sleeve being transversely divided and adapted for distortion permitting relative oscillation of said inner sleeve and said sleeve of said radius arm; means for securing said intermediate sleeve and said sleeve of said radius arm together around said axle; and a wheel rotatably associated with said radius arm.

BRUCE BURNS.